(12) United States Patent
Hibi

(10) Patent No.: US 8,827,367 B2
(45) Date of Patent: Sep. 9, 2014

(54) VEHICLE SEAT

(75) Inventor: Kazuhiro Hibi, Aichi (JP)

(73) Assignee: Toyota Shatai Kabushiki Kaisha, Aichi-Ken (JP)

( * ) Notice: Subject to any disclaimer, the term of this patent is extended or adjusted under 35 U.S.C. 154(b) by 128 days.

(21) Appl. No.: 13/392,464

(22) PCT Filed: Dec. 21, 2009

(86) PCT No.: PCT/JP2009/071219
§ 371 (c)(1),
(2), (4) Date: Feb. 24, 2012

(87) PCT Pub. No.: WO2011/030473
PCT Pub. Date: Mar. 17, 2011

(65) Prior Publication Data
US 2012/0153697 A1    Jun. 21, 2012

(30) Foreign Application Priority Data

Sep. 9, 2009  (JP) ................... 2009-207850

(51) Int. Cl.
*A47C 1/00* (2006.01)
*B60N 2/14* (2006.01)
*B60N 3/06* (2006.01)
*B60N 2/18* (2006.01)
*B60N 2/12* (2006.01)
*B60N 2/07* (2006.01)
*B60N 2/02* (2006.01)

(52) U.S. Cl.
CPC ............... *B60N 2/0232* (2013.01); *B60N 2/14* (2013.01); *B60N 2002/024* (2013.01); *B60N 3/06* (2013.01); *B60N 2/1853* (2013.01); *B60N 2/12* (2013.01); *B60N 2/0715* (2013.01); *B60N 2/1839* (2013.01)

USPC ................. 297/344.24; 297/330; 297/344.23

(58) Field of Classification Search
CPC ..... A47D 1/002; A61G 5/14; A47C 1/03255; A47C 3/18
USPC ............ 297/327, 330, 325, 313, 316, 344.24, 297/344.23
See application file for complete search history.

(56) References Cited

U.S. PATENT DOCUMENTS 4,846,529 A * 7/1989 Tulley ..................... 297/344.23
5,524,952 A * 6/1996 Czech et al. ............... 296/65.12
(Continued)

FOREIGN PATENT DOCUMENTS

JP    63-40237         3/1988
JP    3-231040 A      10/1991
(Continued)

*Primary Examiner* — David R Dunn
*Assistant Examiner* — Alexander Harrison
(74) *Attorney, Agent, or Firm* — Christensen Fonder P.A.

(57) ABSTRACT

The present invention provides a vehicle seat that is constructed to tilt a seat main body such that a front side thereof can be raised, which may include a seat main body support portion that supports the seat main body, a connection mechanism that connects the seat main body to the seat main body support portion, so as to tilt the seat main body on the seat main body support portion such that a front side thereof can be raised, and a drive mechanism that is disposed between a protruded end portion of the seat main body support portion protruded horizontally with respect to the seat main body and an outer surface of the seat main body and is constructed to change a vertical distance between the protruded end portion of the seat main body support portion and the outer surface of the seat main body, so as to tilt the seat main body such that the front side thereof can be raised.

2 Claims, 6 Drawing Sheets

(56) References Cited

U.S. PATENT DOCUMENTS

| | | | | |
|---|---|---|---|---|
| 5,720,462 | A | * | 2/1998 | Brodersen .................... 248/425 |
| 6,024,398 | A | * | 2/2000 | Horton et al. ............... 296/65.07 |
| 6,981,746 | B2 | * | 1/2006 | Chung et al. ............. 297/344.21 |
| 7,422,264 | B1 | * | 9/2008 | Lung et al. ................. 296/65.01 |
| 7,850,242 | B2 | * | 12/2010 | Taguchi et al. .......... 297/344.24 |
| 8,033,605 | B2 | * | 10/2011 | Miura et al. ............. 297/344.14 |
| 8,523,263 | B2 | * | 9/2013 | Kimura et al. ............ 296/65.13 |
| 2006/0226685 | A1 | * | 10/2006 | Priepke et al. ........... 297/344.24 |
| 2007/0222267 | A1 | * | 9/2007 | Tsujimoto et al. ........ 297/344.24 |
| 2010/0052392 | A1 | * | 3/2010 | Lung et al. ................ 297/344.24 |
| 2010/0072797 | A1 | * | 3/2010 | Telesco .................... 297/216.19 |

FOREIGN PATENT DOCUMENTS

| | | |
|---|---|---|
| JP | 2004-026013 A | 1/2004 |
| JP | 2004-026014 A | 1/2004 |

* cited by examiner

VEHICLE SEAT

PRIORITY CLAIM

The present application is a National Phase entry of PCT Application No. PCT/JP2009/071219, filed Dec. 21, 2009, which claims priority from Japanese Patent Application Number 2009-207850, filed Sep. 9, 2009, the disclosures of which are hereby incorporated by reference herein in their entirety.

TECHNICAL FIELD

The present invention relates to a vehicle seat that is constructed to tilt a seat main body such that a front side thereof can be raised.

BACKGROUND ART

A vehicle seat related thereto is disclosed in Japanese Patent No. 4024601 (Japanese Laid-Open Patent Publication No. 2004-26014).

The vehicle seat disclosed in Japanese Patent No. 4024601 has a tilting mechanism that is capable of tilting a seat main body such that a front side thereof can be raised when the seat main body is horizontally rotated. The tilting mechanism has an arcuate plate that is provided on a vehicle floor side, and a rolling roller that is provided on a lower front portion of the seat main body and is capable of rolling on the arcuate plate depending on horizontal rotation of the seat main body. The arcuate plate is gently inclined so as to be increased in height toward a door opening and is formed to have a helical shape. Therefore, when the seat main body horizontally rotates toward the door opening, the rolling roller rolls on the arcuate plate, so that a front portion of the seat main body can be raised gradually. Thus, the seat main body is tilted such that the front side thereof can be raised. As a result, a footrest or other such members can pass over a rocker of the door opening.

In the vehicle seat described above, the tilting mechanism constructed of the arcuate plate and the rolling roller is disposed on a lower side of the seat main body. Further, the rolling roller is constructed to be placed on the arcuate plate. The arcuate plate is formed to have the helical shape. Therefore, the tilting mechanism may have an increased height dimension.

Thus, as compared with an ordinary vehicle seat, in the vehicle seat described above, a seating position of the seat main body can be heightened.

Thus, there is a need in the art to provide an improved vehicle seat.

SUMMARY OF THE INVENTION

A first aspect of the present invention provides a vehicle seat that is constructed to tilt a seat main body such that a front side thereof can be raised, which may include a seat main body support portion that supports the seat main body, a connection mechanism that connects the seat main body to the seat main body support portion, so as to tilt the seat main body on the seat main body support portion such that a front side thereof can be raised, and a drive mechanism that is disposed between a protruded end portion of the seat main body support portion protruded horizontally with respect to the seat main body and an outer surface of the seat main body and is constructed to change a vertical distance between the protruded end portion of the seat main body support portion and the outer surface of the seat main body, so as to tilt the seat main body such that the front side thereof can be raised.

According to the first aspect of the present invention, the seat main body is connected to the seat main body support portion via the connection mechanism, so as to be tilted such that a front side thereof can be raised. Further, the drive mechanism that is capable of generating power for tilting the seat main body is disposed between the protruded end portion of the seat main body support portion protruded horizontally with respect to the seat main body and the outer surface of the seat main body.

That is, the drive mechanism is disposed on the outer surface of the seat main body, and only the connection mechanism is disposed on a lower side of the seat main body. Therefore, the seat main body can be extremely lowered, so that a seating point of the seat main body can be lowered.

In the second aspect of the present invention, the seat main body support portion may include a rotating table that horizontally rotatably support the seat main body, and an outer slide member that is positioned on the rotating table and is constructed to move the seat main body to a vehicle exterior via a door opening by sliding along the rotating table. The seat main body is attached to the outer slide member via the connection mechanism. The drive mechanism is disposed between the outer surface of the seat main body and the protruded end portion of the outer slide member.

That is, in the vehicle seat having the outer slide member that is constructed to move the seat main body to the vehicle exterior via the door opening, the seat main body can be tilted.

In the third aspect of the present invention, the drive mechanism may have a screw shaft that is vertically positioned, a motor for rotating the screw shaft, and a nut threadably engaging the screw shaft. The nut is connected to one of the seat main body support portion and the seat main body. The motor and the screw shaft are connected to the other of the seat main body support portion and the seat main body.

Thus, the seat main body can be tilted due to threadable engagement of the screw shaft and the nut. This facilitates adjustment of tilting of the seat main body.

In the fourth aspect of the present invention, when the rotating table of the seat main body support portion horizontally rotates the seat main body from a vehicle forward-facing position, so that a front lowermost portion of the seat main body comes closer to a rocker that constitutes the door opening, the drive mechanism may tilt the seat main body such that the front side of the seat main body can be raised, thereby allowing the front side lowermost portion of the seat main body to pass over the rocker.

That is, when the front side lowermost portion of the seat main body passes over the rocker, the seat main body can be tilted such that the front side thereof can be raised. Therefore, as compared with a case in which the seat main body is started to be tilted from an initial stage of rotation of the seat main body, an oppressive feeling provided to a sitting person of a rear seat positioned behind the seat main body can be reduced.

According to the present invention, in a vehicle seat that is constructed to tilt a seat main body such that a front side thereof can be raised, a seating position of the seat main body can be lowered.

BRIEF DESCRIPTION OF THE DRAWINGS

FIG. 4 (B) is a schematic side view, illustrating the tilting motion of the vehicle seat;

FIG. 6 (B) is a schematic plan view, illustrating a rotation/slide operation of the vehicle seat;

FIG. 6 (C) is a schematic plan view, illustrating a rotation/slide operation of the vehicle seat; and FIG. 6 (D) is a schematic plan view, illustrating a rotation/slide operation of the vehicle seat.

DETAILED DESCRIPTION OF THE INVENTION

Embodiment 1

Figure 1:
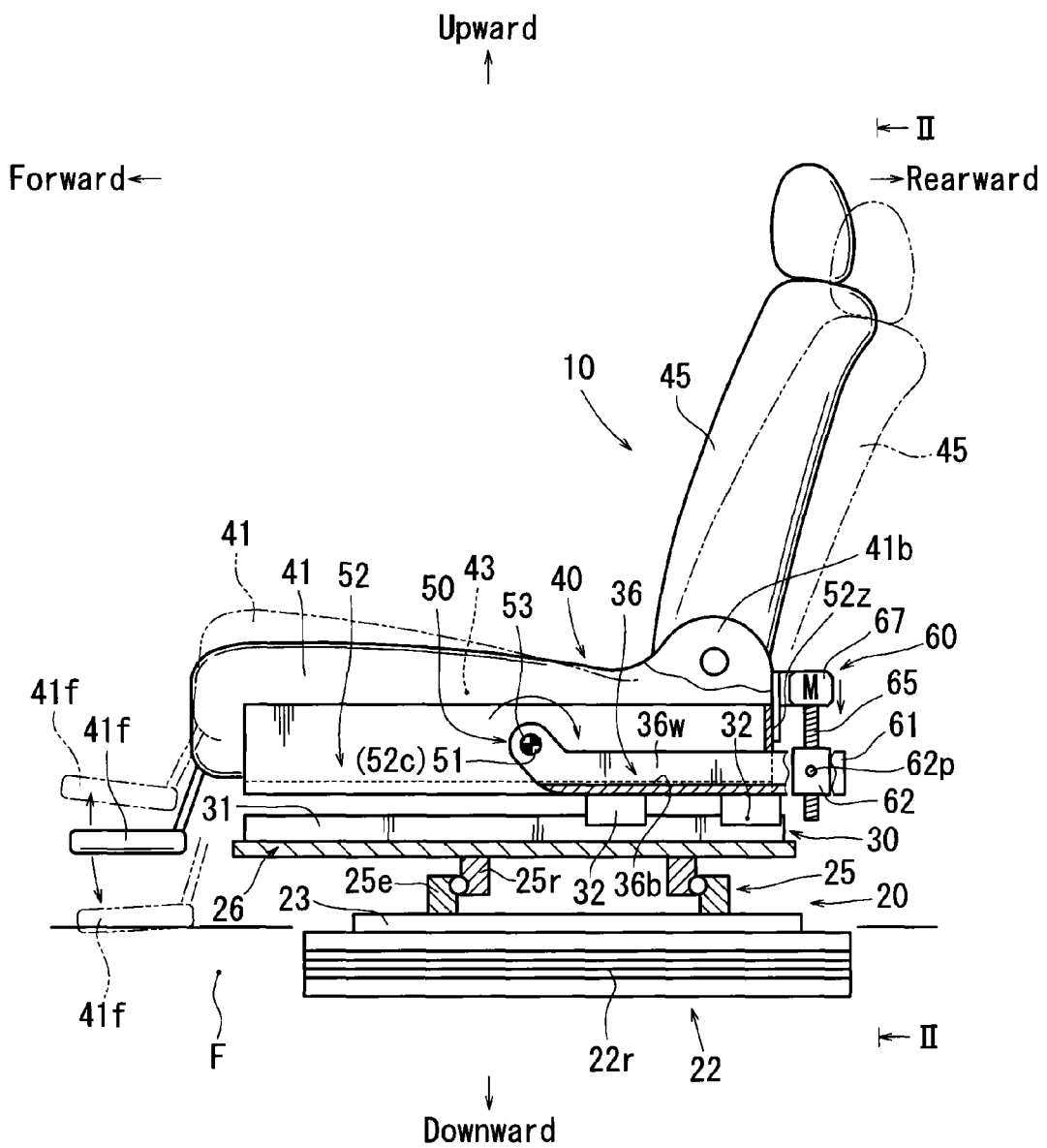
FIG. 1 is a schematic vertical sectional view (a cross-sectional view taken along line I-I of FIG. 2) of a vehicle seat according to Embodiment 1 of the present invention.

In the following, a vehicle seat according to Embodiment 1 of the present invention will be described with reference to FIGS. 1 to 6 (D).

Further, forward and rearward, rightward and leftward, and upward and downward in the drawings respectively correspond to forward and rearward, rightward and leftward, and upward and downward of a vehicle seat and a passenger vehicle having the vehicle seat. Further, forward and rearward, rightward and leftward, and upward and downward referred to in the specification also correspond to forward and rearward, rightward and leftward, and upward and downward as defined above.

[Outline of Vehicle Seat 10]

Figure 4A:
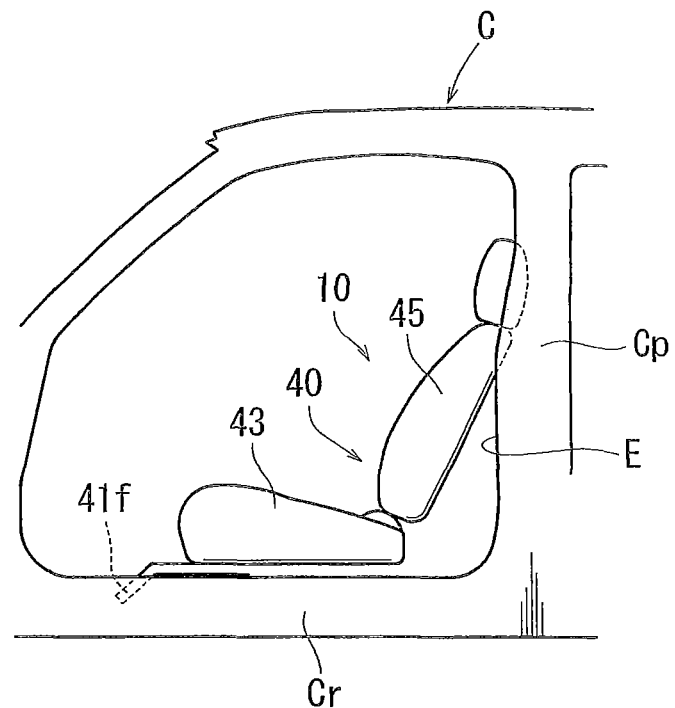
FIG. 4 (A) is a schematic side view, illustrating a tilting motion of the vehicle seat.

As shown in FIGS. 4 (A) and 4 (B), a vehicle seat 10 according to the present embodiment is a seat (a passenger seat or other such seats) that is constructed such that a person can get in and out of a passenger vehicle C from the left side via a left side door opening E.

Figure 2:
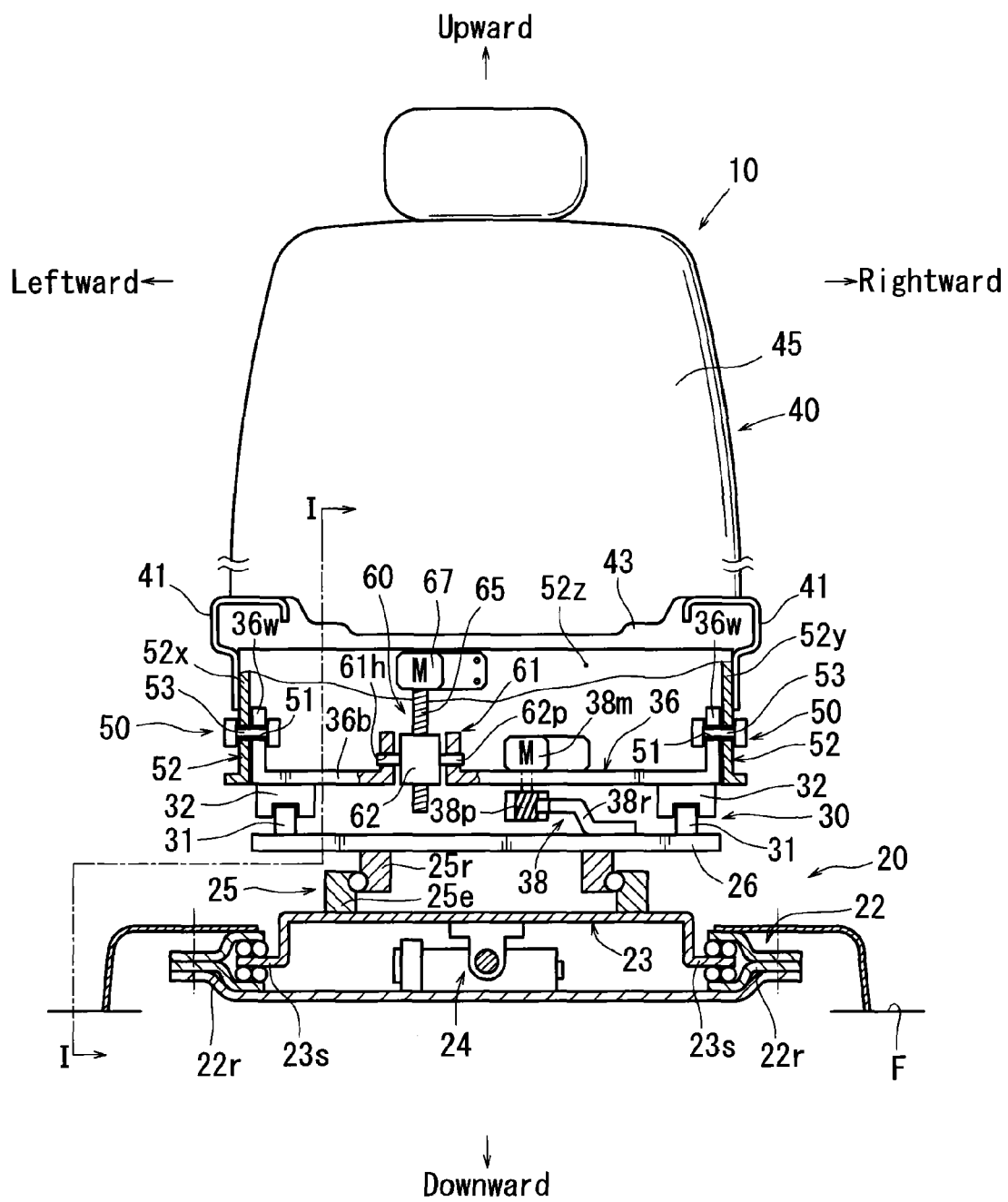
FIG. 2 is a partially cutaway rear side schematic view (a view viewed from line II-II of FIG. 1) of the vehicle seat.

As shown in FIGS. 1 and 2, the vehicle seat 10 has a seat main body 40, a slide/rotation mechanism 20 that is configured to horizontally rotate the seat main body 40 from a vehicle forward-facing position to a laterally-facing position facing the door opening E while longitudinally sliding the same, an outer slide mechanism 30 that is configured to slide the seat main body 40 positioned in the laterally-facing position toward a vehicle exterior with respect to a rotating table 26 of the slide/rotation mechanism 20, a connection mechanism 50 that is capable of connecting the seat main body 40 to an outer slide table 36 of the outer slide mechanism such that the seat main body 40 can be longitudinally tilted, and a drive mechanism 60 for generating power that is capable of tilting the seat main body 40 with respect to the outer slide table 36.

As shown in FIG. 1 and others, the seat main body 40 is composed of a seat frame 41, a seat cushion 43 that is disposed on the seat frame 41, and a seat back 45 that is vertically rotatably connected to a rear end portion 41b of the seat frame 41. Further, a footrest 41f on which a sitting person can rest his/her feet is attached to a front end portion of the seat frame 41. The footrest 41f is configured to be protruded downward from the seat frame 41.

The footrest 41f corresponds to a front lowermost portion of the seat main body in the present invention.

[Regarding Slide/Rotation Mechanism 20]

The slide/rotation mechanism 20 is constructed to leftwardly horizontally rotate the seat main body 40 while sliding the same forwards to avoid a center pillar Cp (FIGS. 4 (A) and 4(B)) when a passenger gets out of the vehicle. As shown in FIGS. 1 and 2, the slide/rotation mechanism 20 is constructed of a slide mechanism 22 that is capable of longitudinally sliding a slide table 23 on a vehicle floor F, and a rotation mechanism 25 that is capable of horizontally rotating the rotating table 26 on the slide table 23. The slide mechanism 22 has a pair of right and left stationary rails 22r that extend in a longitudinal direction on the vehicle floor F. Further, slide plate portions 23s formed in right and left end edges of the slide table 23 are slidably fitted in these stationary rails 22r. Further, disposed between the stationary rails 22r and the slide table 23 is a drive mechanism 24 for longitudinally sliding the slide table 23. The drive mechanism 24 is constructed of a motor or other such devices.

The rotation mechanism 25 is composed of an inner ring 25r and an outer ring 25e that are coupled to each other so as to be rotated relative to each other about an axis, and a drive mechanism such as a motor (not shown) for rotating the rings 25e and 25r relative to each other about the axis. Further, a lower surface of the outer ring 25e is secured to an upper surface of the slide table 23, and an upper surface of the inner ring 25r is secured to a lower surface of the rotating table 26.

[Regarding Outer Slide Mechanism 30]

Figure 3:
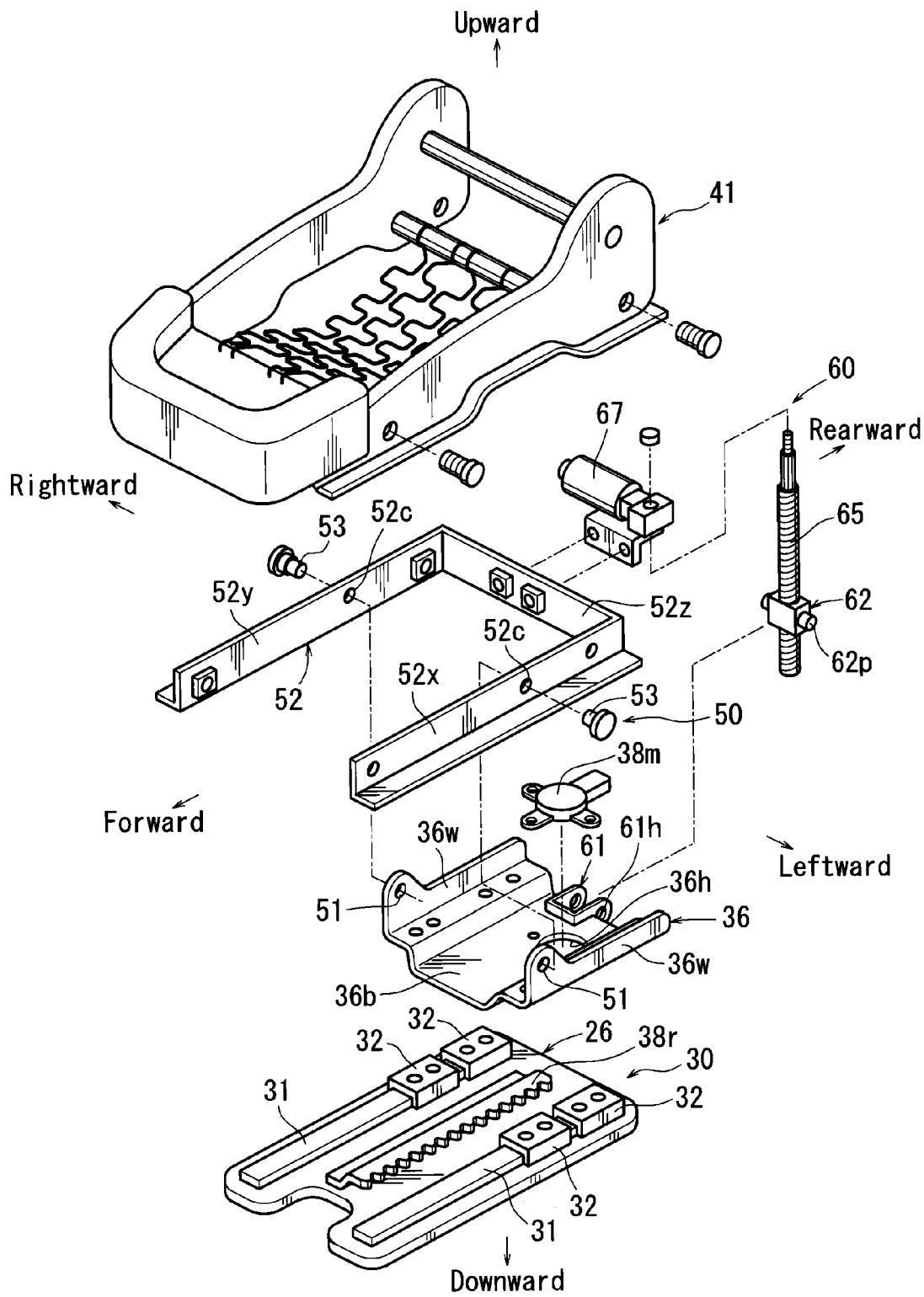
FIG. 3 is a perspective view, illustrating a seat frame, an outer slide table, a rotating table and others of the vehicle seat.

The outer slide mechanism 30 is disposed on the rotating table 26. The outer slide mechanism 30 is a mechanism that is capable of sliding the seat main body 40 toward the vehicle exterior with respect to a rotating table 26 when the seat main body 40 is horizontally rotated to the laterally-facing position facing the door opening E by action of the slide/rotation mechanism 20. As shown in FIGS. 1 to 3, the outer slide mechanism 30 is composed of a pair of right and left lower rails 31 that extend in a longitudinal direction of the rotating table 26 on the rotating table 26, two sets of sliders 32 that are fitted to the right and left lower rails 31 so as to be slidable along the lower rails 31, an outer slide table 36 disposed on the sliders 32, and a drive mechanism 38 capable of sliding the outer slide table 36.

As shown in FIGS. 2 and 3, the drive mechanism 38 has a rack 38r that is disposed on the rotating table 26 in parallel with the right and left lower rails 31, and a pinion 38p (FIG. 2) meshing with the rack 38r. The pinion 38p is attached to a rotation shaft of a motor 38m that is secured to the outer slide table 36, and meshes with the rack 38r while it is protruded downwards from the outer slide table 36 through an opening 36h (FIG. 3) formed in the outer slide table 36.

According to a structure thus constructed, when the pinion 38p is rotated in a normal direction or a reverse direction by action of the motor 38m, the pinion 38p moves longitudinally along the rack 38r. Thus, the outer slide table 36 moves along the pair of right and left lower rails 31, so as to move forwardly or rearwardly with respect to the rotating table 26.

As shown in FIGS. 2 and 3, the outer slide table 36 has a flat plate portion 36b and vertical wall portions 36w positioned in right and left sides of the flat plate portion 36b, and has a substantially flat U-shape in front view. Further, the sliders 32 previously described are secured to right and left sides of a lower surface of the flat plate portion 36b of the outer slide table 36. Further, as shown in FIGS. 1 and 3, formed in front end positions of the right and left vertical wall portions 36w of the outer slide table 36 are bearing holes 51 that constitute the connection mechanism 50, which will be hereinafter described. Further, the bearing holes 51 formed in the right and left vertical wall portions 36w are positioned so as to be coaxially aligned with each other.

In addition, formed in a rear end portion of the outer slide table 36 is a nut support portion 61 capable of supporting a nut 62 that constitutes a drive mechanism 60, which will be hereinafter described.

[Regarding Connection Mechanism 50]

The connection mechanism 50 is a mechanism for connecting the seat main body 40 to the outer slide table 36, and is constructed to tilt the seat main body 40 with respect to the outer slide table 36 and the rotating table 26 such that a front side of the seat main body 40 can be raised. The connection mechanism 50 has the bearing holes 51 formed in the right and left vertical walls 36w of the outer slide table 36, which was described above, a frame-shaped holder 52 capable of supporting the seat main body 40, and connection pins 53 that are capable of vertically rotatably attaching the holder 52 to the vertical wall portions 36w of the outer slide table 36. As shown in FIG. 3, the holder 52 has a left side portion 52x, a right side portion 52y and a rear side portion 52z, and is formed as a frame-shaped member having a substantially U-shape. Further, as shown in FIG. 2, the holder 52 is configured such that the right and left vertical wall portions 36w of the outer slide table 36 can be received between the left side portion 52x and the right side portion 52y. Further, the holder 52 is configured to be fitted into the seat frame 41 from below. Further, a right side surface of the seat frame 41 is bolted on the right side portion 52y of the holder 52 at front and rear portions thereof. Conversely, a left side surface of the seat frame 41 is bolted on the left side portion 52x of the holder 52 at front and rear portions thereof. Thus, the holder 52 and the seat frame 41 can be integrated with each other. As a result, the holder 52 may function as a part of the seat main body 40.

Through-holes 52c are respectively formed in longitudinally central portions of the left side portion 52x and the right side portion 52y of the holder 52. The through-holes 52c are positioned to be coaxially aligned with each other. Further, the connection pins 53 are horizontally passed through the right and left through-holes 52c and the right and left bearing holes 51 while the right and left through-holes 52 of the holder 52 and the right and left bearing holes 51 of the outer slide table 36 are aligned with each other. This enables the holder 52 to rotate about the connection pins 53. Thus, the holder 52 can rotate to the left or to the right with respect to the outer slide table 36. Further, because the holder 52 is integrated with the seat main body 40, when the holder 52 rotates to the right about the connection pins 53 in a condition shown in FIG. 1, the seat main body 40 can be tilted with respect to the outer slide table 36 and the rotating table 26 such that the front side thereof can be raised. To the contrary, when the holder 52 rotates to the left about the connection pins 53, the seat main body 40 can be tilted with respect to the outer slide table 36 and the rotating table 26 such that the front side thereof can be lowered.

Further, as shown in FIG. 1, in a condition in which the holder 52 and the outer slide table 36 are connected by the connection mechanism 50, the nut support portion 61 provided to the rear end portion of the outer slide table 36 can be protruded rearwardly with respect to the seat main body 40.

The rotating table 26, the outer slide table 36 and others correspond to a seat main body support portion of the present invention. The nut support portion 61 of the outer slide table 36 corresponds to a protruded end portion of the seat main body support portion of the present invention. Further, the outer slide table 36 corresponds to an outer slide member of the present invention.

[Regarding Drive Mechanism 60]

The drive mechanism 60 is a mechanism that is capable of generating the power for tilting the seat main body 40 with respect to the outer slide table 36 and the rotating table 26; and is constructed to lower or raise a rear end portion (the rear side portion 52z) of the holder 52 with respect to the rear end portion of the outer slide table 36.

That is, as shown in FIGS. 1 to 3, the drive mechanism 60 has a screw shaft 65 that is vertically positioned, a motor 67 for rotating the screw shaft 65, and a nut 62 threadably engaging the screw shaft 65. As shown in FIG. 3 and others, the motor 67 is secured to an outer side surface of the rear side portion 52z of the holder 52. The screw shaft 65 is suspended vertically from the motor 67 while an upper end portion thereof is connected to the motor 67.

Further, the nut 62 threadably engaging the screw shaft 65 is vertically attached to the nut support portion 61 provided to the rear end portion of the outer slide table 36. Further, formed in an outer side surface of the nut 62 has a pair of pin portions 62p that are radially outwardly projected therefrom. The pin portions 62p are oppositely positioned across a center of the nut 62 so as to be coaxially aligned with each other. The pin portions 62p of the nut 62 are respectively rotatably fitted to right and left horizontal support holes 61h (FIGS. 2 and 3) formed in the nut support portion 61 of the outer slide table 36. Thus, the nut 62 can be slightly tilted in the longitudinal direction with respect to the nut support portion 61 of the outer slide table 36. Therefore, even if the screw shaft 65 is slightly tilted in the longitudinal direction as a result of rotation of the holder 52 with respect to the outer slide table 36 about the connection pins 53, the nut 62 can absorb a tilting amount of the screw shaft 65.

When the screw shaft 65 is rotated in a normal rotational direction by actuation of the motor 67 of the drive mechanism 60, the nut 62 can relatively move toward the motor 67 due to threadable engagement of the screw shaft 65 and the nut 62. As a result, a distance between the rear side portion 52z of the holder 52 and the nut support portion 61 of the outer slide table 36 is reduced, so that the rear side portion 52z of the holder 52 can be pulled downwardly. As a result, the holder 52 can rotate to the right about the connection pins 53 in the condition shown in FIG. 1. Thus, the seat main body 40 integrated with the holder 52 can be tilted with respect to the outer slide table 36 and the rotating table 26 such that the front side thereof can be raised (chain double-dashed line).

To the contrary, when the screw shaft 65 is rotated in a reverse rotational direction, the nut 62 can relatively move away from the motor 67 due to the threadable engagement of the screw shaft 65 and the nut 62. As a result, the distance between the rear side portion 52z of the holder 52 and the nut support portion 61 of the outer slide table 36 is increased, so that the rear side portion 52z of the holder 52 can be pushed upwardly. As a result, the holder 52 can rotate to the left about the connection pins 53. Thus, the seat main body 40 can be tilted with respect to the outer slide table 36 and the rotating table 26 again, so as to be returned to an original position.

Further, in this condition, when the screw shaft 65 is continuously rotated in the reverse rotational direction, the seat main body 40 can be tilted with respect to the outer slide table 36 and the rotating table 26 such that the front side thereof can be lowered.

[Regarding Operation of Vehicle Seat 10 According to Present Embodiment]

First, an operation of the vehicle seat 10 when the passenger gets out of the vehicle will be described. Further, when the passenger is getting in the vehicle, the seat main body 40 faces forwardly of the vehicle. Further, the motor 67 and the nut 62 of the drive mechanism 60 are positioned spaced away from each other, so that the seat main body 40 is returned to a position in which the seat main body 40 is not tilted longitudinally (the original position; FIG. 1).

Figure 4B:
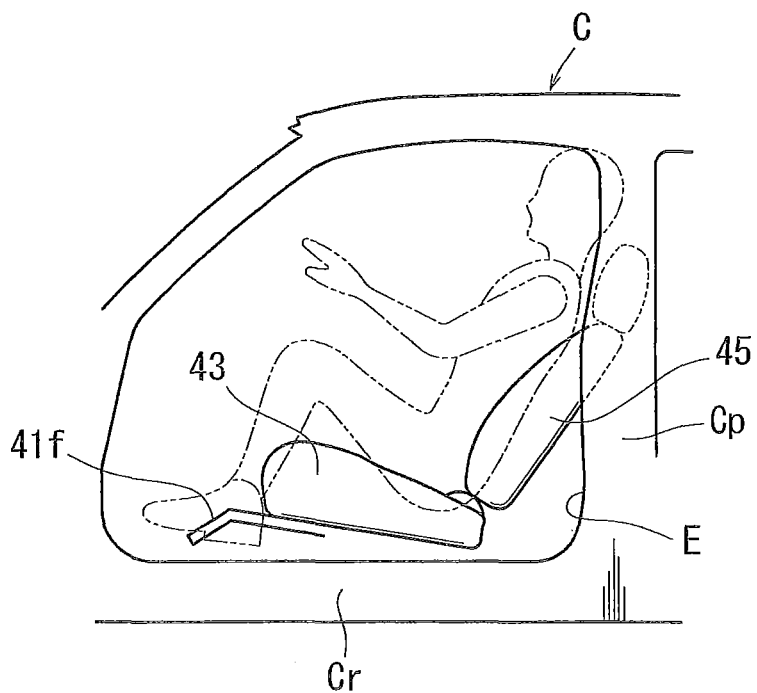
Figure 5:
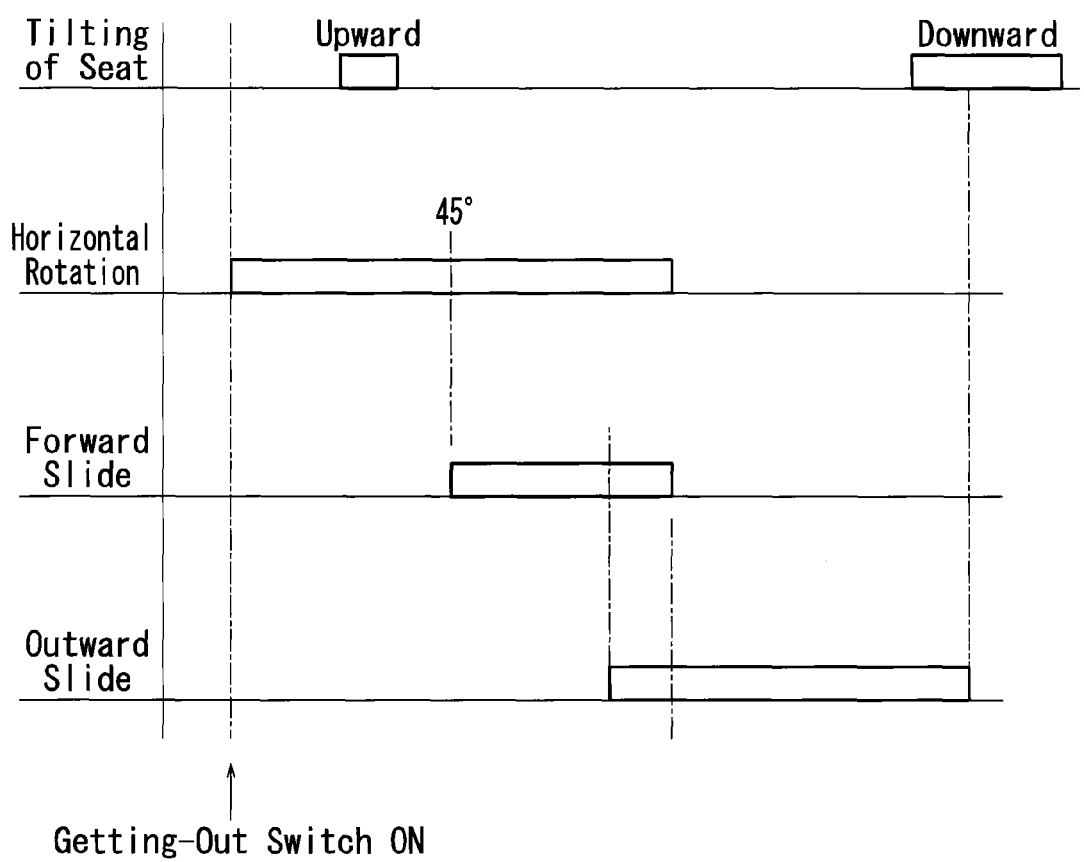
FIG. 5 is a time-line chart, illustrating motions of the vehicle seat.
Figure 6A:
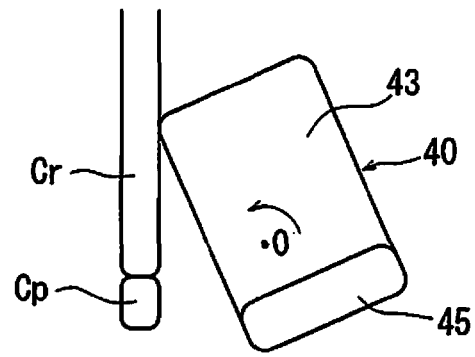
FIG. 6 (A) is a schematic plan view, illustrating a rotation/slide operation of the vehicle seat.

When the passenger gets out of the vehicle, the passenger unfastens a seatbelt and then operates a getting-out switch (not shown) while a left door is opened. As a result, as shown in FIG. 5, the rotation mechanism 25 of the slide/rotation mechanism 20 is first actuated, so that the seat main body 40 can be rotated horizontally to the left. As shown in FIG. 6(A), when a left front end portion of the seat main body 40 comes closer to a rocker Cr that constitutes a lower side of the door opening E due to rotation of the seat main body 40 by a predetermined angle, the motor 67 of the drive mechanism 60 can be driven. That is, the screw shaft 65 of the drive mechanism 60 is rotated in the normal rotational direction, so that the nut 62 can relatively move toward the motor 67. As a result, the rear side portion 52z of the holder 52 can be pulled downwardly, so that the seat main body 40 integrated with the holder 52 can be tilted with respect to the outer slide table 36 and the rotating table 26 such that the front side thereof can be raised. Thus, as shown in FIG. 4(B), the footrest 41f of the seat main body 40 can pass over the rocker Cr of the door opening E.

Figure 6B:
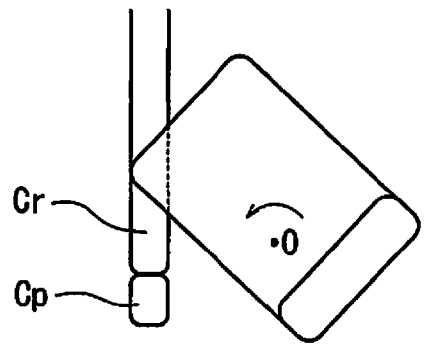
Figure 6C:
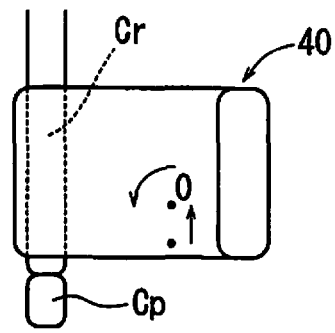
Figure 6D:
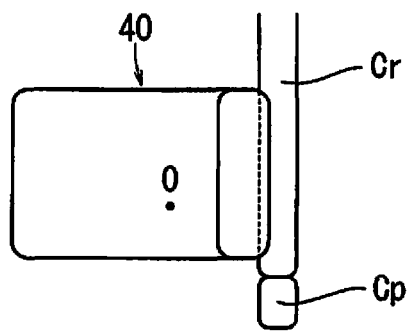

Further, as shown in FIG. 6(B), when the seat main body 40 rotates to the left by approximately 45 degrees, the slide mechanism 22 of the slide/rotation mechanism 20 can be operated, as shown in FIG. 5. As a result, the seat main body 40 can rotate to the left while sliding forwardly by action of the slide mechanism 22 and the rotation mechanism 25 of the slide/rotation mechanism 20, so as to face the door opening E while avoiding the center pillar Cp (FIG. 6(C)). Thereafter, immediately before the slide/rotation mechanism 20 is stopped, the outer slide mechanism 30 is actuated, so that the outer slide table 36 can slide toward the vehicle exterior with respect to the rotating table 26. As a result, as shown in FIG. 6(D), the seat main body 40 can move to the vehicle exterior via the door opening E. Subsequently, as shown in FIG. 5, immediately before the outer slide mechanism 30 is stopped, the drive mechanism 60 is actuated such that the rear side portion 52z of the holder 52 can be pushed upwardly. As a result, the seat main body 40 can be tilted beyond the original position until the seat main body 40 reaches a condition in which the front side thereof can be lowered.

In this condition, the sitting person can easily get out of the vehicle.

To the contrary, in order to return the seat main body 40 from a position in the vehicle exterior to an initial position in the vehicle interior, the drive mechanism 60, the outer slide mechanism 30, the slide/rotation mechanism 20 and others can be actuated in the inverse order from the order described above.

[Advantages of Vehicle Seat 10 According to the Present Embodiment]

In the vehicle seat 10 according to the present embodiment, the seat main body 40 is connected to the outer slide table 36 (the seat main body support portion) by the connection mechanism 50 in a condition in which the seat main body 40 can be tilted such that the front side thereof can be raised. In addition, the drive mechanism 60 that is capable of generating the power for tilting the seat main body 40 is disposed between the nut support portion 61 of the outer slide table 36 (the protruded end portion of the seat main body support portion) protruded horizontally with respect to the seat main body 40 and a rear surface of the seat main body 40 (the rear side portion 52z of the holder 52).

That is, the drive mechanism 60 is disposed on the rear surface of the seat main body 40, and only the connection mechanism 50 is disposed on a lower side of the seat main body 40. Therefore, the seat main body 40 can be extremely lowered, so that a seating point of the seat main body 40 can be lowered.

Further, because the seat main body 40 can be tilted due to the threadable engagement of the screw shaft 65 and the nut 62, adjustment of tilting of the seat main body 40 can be facilitated.

Further, when the footrest 41f (the front lowermost portion) of the seat main body 40 passes over the rocker Cr of the door opening E, the seat main body 40 can be tilted such that the front side thereof can be raised. Therefore, as compared with a case in which the seat main body 40 is started to be tilted from an initial stage of rotation of the seat main body 40, an oppressive feeling provided to a sitting person of a rear seat positioned behind the seat main body 40 can be reduced.

[Modified Forms]

Further, the present invention is not limited to the embodiment described above and can be modified without departing from the scope of the present invention. For example, in the vehicle seat 10 according to the embodiment described above, the present invention is applied to the vehicle seat in which the outer slide mechanism 30 (the outer slide table 36) is positioned on the rotating table 26. However, the present invention can be applied to a vehicle seat in which the rotating table 26 and the outer slide mechanism 30 (the outer slide table 36) are omitted.

Further, in the present embodiment described above, the drive mechanism 60 is composed of the screw shaft 65, the nut 62 and others. However, an air cylinder or other such devices can be used instead of the screw shaft 65, the nut 62 and others. Further, in the example, the drive mechanism 60 is positioned in a rear end portion of the seat main body 40. However, the drive mechanism 60 can be positioned in a left side surface or a right side surface of the seat main body 40.

The invention claimed is:

1. A vehicle seat having a rotating table that is constructed to be horizontally rotatable, and an outer slide member that is positioned on the rotating table and is constructed to move a seat main body to a vehicle exterior via a door opening by sliding along the rotating table while supporting the seat main body thereon, comprising:
    a connection mechanism that connects the seat main body to the outer slide member, so as to tilt the seat main body on the outer slide member such that a front side thereof can be raised, and
    a drive mechanism that is disposed between a protruded rear end portion of the outer slide member protruded horizontally rearwardly with respect to the seat main body and a rear end surface of the seat main body and is constructed to change a vertical distance between the protruded rear end portion of the outer slide member and the rear end surface of the seat main body, so as to tilt the seat main body such that the front side thereof can be raised,
    wherein the connection mechanism includes right and left bearing holes formed in the outer slide member, a frame-shaped holder integrated with the seat main body and having right and left through-holes, and connection pins,
    wherein the holder is connected to the outer slide member while the pins are horizontally passed through the right and left through holes and the bearing holes, so that the seat main body can be tilted such that the front side thereof can be raised when the holder rotates about the connection pins, and wherein the drive mechanism comprises a screw shaft that is rotatably connected to one of the rear end portion of the outer slide member and rear end portion of the holder and is vertically positioned, a motor for rotating the screw shaft, and a nut that is connected to the other of the rear end portion of the outer slide member and the rear end portion holder and threadably engages the screw shaft.

2. The vehicle seat according to claim 1, wherein when the rotating table horizontally rotates the seat main body from a vehicle forward-facing position, so that a front lowermost portion of the seat main body comes closer to a rocker that constitutes the door opening, the drive mechanism tilts the seat main body such that the front side of the seat main body can be raised, thereby allowing the front side lowermost portion of the seat main body to pass over the rocker.

* * * * *